(12) United States Patent
Kunisada et al.

(10) Patent No.: US 7,265,068 B2
(45) Date of Patent: Sep. 4, 2007

(54) LIGHT SHIELDING SHEET

(75) Inventors: Yoshitaka Kunisada, Okayama (JP); Takaaki Miyake, Okayama (JP)

(73) Assignee: Hagihara Industries Inc., Kurashiki-shi (JP)

( * ) Notice: Subject to any disclaimer, the term of this patent is extended or adjusted under 35 U.S.C. 154(b) by 0 days.

(21) Appl. No.: 10/486,922

(22) PCT Filed: Aug. 26, 2002

(86) PCT No.: PCT/JP02/08549

§ 371 (c)(1),
(2), (4) Date: Feb. 24, 2004

(87) PCT Pub. No.: WO03/018306

PCT Pub. Date: Mar. 6, 2003

(65) Prior Publication Data

US 2004/0198126 A1  Oct. 7, 2004

(30) Foreign Application Priority Data

Aug. 27, 2001 (JP) .............................. 2001-255416

(51) Int. Cl.
*B32B 27/12* (2006.01)
(52) U.S. Cl. ...................... 442/394; 442/286; 442/287
(58) Field of Classification Search ................ 442/394, 442/286, 186, 187, 288–292
See application file for complete search history.

(56) References Cited

U.S. PATENT DOCUMENTS

| 4,898,761 | A | * | 2/1990 | Dunaway et al. ........... 428/137 |
| 4,906,517 | A | * | 3/1990 | Akao et al. ................. 428/216 |
| 5,763,069 | A | * | 6/1998 | Jordan ........................ 428/323 |
| 5,942,744 | A | * | 8/1999 | Kamo et al. ................ 235/487 |
| 6,060,137 | A | * | 5/2000 | Akao ......................... 428/35.2 |
| 6,268,029 | B1 | * | 7/2001 | Akao ......................... 428/35.2 |

FOREIGN PATENT DOCUMENTS

| DE | 100 06 383 A1 | 5/2001 |
| EP | 0 810 086 A2 | 12/1997 |
| EP | 1 147 703 A2 | 10/2001 |
| EP | 1 219 410 A2 | 7/2002 |
| GB | 2 240 745 A | 8/1991 |
| JP | 54-148886 | 11/1979 |
| JP | 55-145166 | 10/1980 |
| JP | 9-172883 | 7/1997 |
| JP | 9-325717 | 12/1997 |

(Continued)

*Primary Examiner*—N. Edwards
(74) *Attorney, Agent, or Firm*—Oblon, Spivak, McClelland, Maier & Neustadt, P.C.

(57) ABSTRACT

Provided is a light-shielding sheet comprising a light-shielding material made of a white film having a light transmission of not more than 50% and a reinforcement made of a textile fabric or a nonwoven fabric. Preferred is a case where the white film is a film having therein voids formed through stretching of the film or a film having therein bubbles formed through foaming by use of a foaming agent, whereby a light-shielding sheet is provided which has a light weight, a high strength and a superior durability and which inhibits temperature increase caused by the heat resulting from sunlight absorption. The light-shielding sheet is employed suitably as a light-shielding material for agricultural use and horticultural use.

22 Claims, 2 Drawing Sheets

FOREIGN PATENT DOCUMENTS

| | | |
|---|---|---|
| JP | 10-203884 | 8/1998 |
| JP | 10-327684 | 12/1998 |
| JP | 11-320736 | 11/1999 |
| JP | 11-333978 | 12/1999 |
| JP | 2002-119146 | 4/2002 |

* cited by examiner

LIGHT SHIELDING SHEET

TECHNICAL FIELD

The present invention relates to a light-shielding sheet, and more particularly to a light-shielding sheet used in various fields such as agriculture, stock raising, construction, tents, etc.

DISCUSSION OF THE BACKGROUND

Films made of thermoplastic resin containing light-reflecting pigment typified by powdery aluminum and white pigment such as titanium oxide or light-absorbing pigment such as carbon black added thereto have heretofore been used as a light-shielding material which is employed mainly as a covering material for greenhouses in the fields of agriculture and horticulture. Making a film containing a light-reflecting pigment such as powdery aluminum and white pigment have a light transmission reduced to a certain level or lower requires addition of a large amount of pigment. The addition of a large amount of pigment will cause problems, e.g. reduction in productivity such as breakage at stretching into a thin film and reduction in mechanical properties. Further, the films containing a light-absorbing pigment such as carbon black are problematic in that the films absorb the light in the daytime and release it as heat in the night to cause the temperature increase in houses.

A light-shielding material made of a thermoplastic resin film such as that mentioned above is so poor in durability that when it is employed alone as a covering material for a house, it is easily broken due to the force applied to the film during the work of spreading it as a house covering material or during the daily-conducted opening and closing work.

JP-A 11-333978 discloses a translucent heat-insulating sheet obtained by laminating an aluminum deposition film and a woven fabric made of flat yarns of high density polyethylene by sandwich lamination. However, the aluminum deposition film is not suitable for folding or the like during the opening and closing work as a house covering material and is problematic in that the aluminum deposition layer peels off.

JP-A 9-172883 discloses a light-shielding net obtained by weaving flat yarns with tape-like fiber lines, which were used as warps and wefts, produced by slitting a nonwoven fabric composed of synthetic resin filaments piled and bonded in high density and in random directions. JP-A 10-327684 discloses a light-shielding net comprising a net base fabric obtained by weaving flat yarns, onto one side of the net base fabric tape-like fiber lines produced by slitting a nonwoven fabric composed of synthetic resin filaments piled and bonded in high density and in random directions have been welded while being spaced apart from one another. However, films or tapes made of such light-reflecting nonwoven fabric are unsatisfactory in abrasion resistance and in strength. They are also defective in handlability at the time of opening, closing and folding because they are bulky. Moreover, they are polluted during their outside use by, for example, adhesion of dust or generation of moss caused by entrance of rain water, then their light reflectance easily decrease. In addition, such nonwoven fabric is more expensive than normal films.

The present invention was made in light of the problems mentioned above. The object of the present invention is to provide a light-shielding sheet which has a lightweight, a high strength and a superior durability and which inhibits the temperature increase caused by absorption of heat from sunlight.

DISCLOSURE OF THE INVENTION

The object of the present invention is achieved by a light-shielding sheet comprising a light-shielding material made of a white film having a, light transmission of not more than 50% and a reinforcement made of a textile fabric or a nonwoven fabric.

It is preferable that the white film be a film having therein voids formed through stretching the film. In addition, it is also preferable that the white film be a film having therein bubbles formed through foaming by use of a foaming agent.

At least one of the light-shielding material and the reinforcement preferably contains a weathering agent, and more preferably contains a weathering agent and an antioxidant. Moreover, it is preferable that a protective film be laminated on a surface of the light-shielding material and that the protective film contain a weathering agent. It is more preferable that the protective film contain a weathering agent and an antioxidant. It is also preferable that the reinforcement be a woven fabric obtained by weaving a drawn yarn made of polyolefin as warps and wefts.

A light-shielding sheet in which the reinforcement is laminated on the back side of the white film is a preferred embodiment. Another preferred embodiment is a light-shielding sheet in which tapes resulting from slitting the white film into a narrow width are laminated on one side of the reinforcement while being spaced apart from one another approximately in parallel. Still another preferred embodiment is a light-shielding sheet comprising a woven fabric obtained by weaving a drawn yarn with a flat yarn as warps and/or wefts, the flat yarn resulting from slitting the white film into a narrow width.

The present invention is described in detail below.

The white film in the present invention has a light transmission of not more than 50%. The invention uses this white film as a light-shielding material. A white film having a light transmission of more than 50% demonstrates only an insufficient light-shielding property. Use of such a white film makes it difficult to achieve the object of the present invention.

There is no particular limitation with respect to the starting resin for the white film. Various types of thermoplastic resin such as polyolefin, polyester, e.g. polyethylene terephthalate and polybutylene terephthalate and polyamide, e.g. nylon 6 and nylon 6,6 are suitably employed. Of these resins, polyolefin is preferably used in view of productivity, drawability and void formability. Specific examples of the polyolefin include polyethylene resins such as high density polyethylene, medium density polyethylene, linear low density polyethylene, branched low density polyethylene, ultra low density polyethylene, linear low density polyethylene produced by use of a metallocene catalyst, ethylene-vinyl acetate copolymer, ethylene-alkyl(meth)acrylate copolymer: and polypropylene resins such as polypropylene, ethylene-propylene block copolymer and ethylene-propylene random copolymer. Above all, polypropylene is particularly preferred from the viewpoints of performance and cost.

Preferable examples of the white film are as follows. One example is a film having therein voids (vacancies by pores) formed through stretching the film. Another example is a film having therein bubbles (cavities) formed through foaming by use of a foaming agent.

The method for obtaining a white film by forming voids in a film by stretching the film is described first.

Voids can be formed by mixing void-forming particles to the starting resin, fabricating the mixture into a film, and then stretching the film. The void-forming particles may be of either incompatible resin or inorganic filler. However, in the case of being incompatible resin, the particles must be incompatible with the starting resin at the stretching temperature. Among those available materials, incompatible resin is preferred. The incompatible resin and the inorganic filler may be used in combination.

When the polyolefin is employed as the starting resin, examples of the incompatible resin include polyolefin such as polymethylpentene; polystyrene; polyester such as polybutylene terephthalate; nylon; and polycarbonate. The incorporation amount of these incompatible resins is within the range of 3-30% by weight, and preferably within the range of 3-10% by weight. If the incorporation amount is less than 3% by weight, only a small amount of voids will be formed and it will become difficult for the condition that the light transmission is not more than 50% to be satisfied. On the other hand, an incorporation amount of over 30% by weight is undesirable because it may result in loss of the inherent properties of polyolefin.

Examples of the inorganic filler include white pigment such as titanium oxide, zinc flower and zinc sulfide; silver pigment such as aluminum powder; and calcium carbonate. The particle size of the inorganic filler is preferably 0.1-1 μm. The incorporation amount of the inorganic filler is preferably 2-20% by weight. An incorporation amount of less than 2% by weight is undesirable because it will result in formation of a small amount of voids. On the other hand, an incorporation amount of over 20% by weight is also undesirable because it may cause falling off of an inorganic filler powder exposed at the surface of a film during the stretching thereof.

Examples of the method for stretching a film include methods of uniaxially or biaxially stretching an unstretched sheet to a predetermined drawn ratio by a known technique such as rolling and tentering. Preferred is biaxial stretching. This stretching operation may be either monostage stretching or multistage stretching. In the case of biaxial stretching, it may be either simultaneous stretching or sequential stretching, but sequential stretching is preferred. In the case of polypropylene, the stretching temperature is not higher than the melting point of the polypropylene, and preferably a temperature ranging from the softening point of the polypropylene to the melting point thereof. Concretely, the stretching temperature is preferably 100-155° C., and more preferably 120-150° C. A stretching temperature lower than 100° C. is undesirable because polypropylene is softened insufficiently and, therefore, is not stretched with stability. On the other hand, a stretching temperature higher than 155° C. is also undesirable because polypropylene is not oriented through the stretching.

In the above-mentioned stretching step, voids (vacancies by pores) are formed within a film through occurrence of relative shift between the starting resin and incompatible resin or inorganic filler forming the film to such an extent that the film does not break. Thus, a light-scattering white film can be obtained.

Next, explained is the method for obtaining a white film by forming bubbles through foaming by use of a foaming agent.

Any known foam molding technique may be adopted. Concretely, preferred is a method in which a foamed film is obtained by use of a foaming agent decomposition method comprising kneading a thermally decomposable foaming agent, which is capable of generating decomposed gas on heating, into a thermoplastic resin such as polyolefin in advance to form a film and then heating the film to a temperature equal to or higher than the decomposition temperature of the foaming agent. Examples of the thermally decomposable foaming agent include azodicarbonamide, azobisformamide, dinitrosopentamethylenetetramine and toluenesulfonylhydrazide. In the formation of a sheet using an extruder, preferred is a method in which a foamed film is obtained by use of a gas entraining technique in which gas or a physical foaming agent vaporizable on heating is supplied under pressure through a pressure feeding port formed in the extruder at its middle portion. Examples of the physical foaming agent include inorganic gases such as air, nitrogen, water and carbon dioxide gas; and organic foaming agents such as flon, butane, pentane and hexane.

The expansion ratio is preferably 1.01-10 and more preferably 1.1-3. One example of the method for obtaining a crosslinked foamed film is a method in which melt kneading is conducted under a temperature lower than the decomposition temperature of the thermally decomposable foaming agent to afford a non-crosslinked and slightly-foamed film, a crosslinking aid is, if necessary, added, then the film is crosslinked by, for example, exposure to an ionizing radiation, and then the film is heated at a temperature equal to or higher than the decomposition temperature of the foaming agent to form the crosslinked foamed film.

In the white film obtained in such a way, because irradiation of the film with light results in irregular reflection of the light by voids or bubbles, the surface of the film is whitened and, therefore, the film has a reduced light transmission. The light transmission of the white film must be not more than 50%, and is preferably not more than 40%. The light transmission is measured by the ASTM-D1003 method. Regarding the whiteness of the white film as a measurement obtained by the ASTM-E313 method, the film preferably has a whiteness of 70 or more and more preferably a whiteness of 80 or more.

The thickness of the white film is preferably 10-100 μm and more preferably 30-60 μm. In the present invention, the white film may be used in the form of a film consisting thereof as a light-shielding material. The white film may also be used in the form of tape-like light-shielding material obtained by slitting the film into a narrow width of about 5-50 mm. Alternatively, a flat yarn obtained by slitting the white film into a narrow width of about 2-20 mm may be used as a light-shielding material.

The following is a description on a reinforcement for constituting the light-shielding material of the present invention in combination with the light-shielding material made of the white film described above. The reinforcement in the present invention is a material which is made of a textile fabric or a nonwoven fabric and which imparts physical strength to the entire light-shielding sheet.

The raw material of the textile fabric used for the reinforcement in the present invention is not restricted particularly and various kinds of fibrous materials are available. For example, natural fibers such as cotton and hemp; regenerated fibers such as rayon; and synthetic fibers such as polyolefin, polyester, polyamide, acrylic fiber, vinylon, polyvinyl chloride and carbon fiber can be employed.

Of these materials, thermoplastic resins are preferable because they can be attached by thermal welding to other materials such as the white film. Examples of suitable thermoplastic resins include polyolefin such as polyethylene and polypropylene; polyester such as polyethylene terephthalate and polybutylene terephthalate; and polyamide such as nylon 6 and nylon 6,6. Above all, polyolefin is suitably employed. Specific examples of the polyolefin include polyethylene resins such as high density polyethylene, medium density polyethylene, linear low density polyethylene, branched low density polyethylene, ultra low density polyethylene, linear low density polyethylene produced by use of a metallocene catalyst, ethylene-vinyl acetate copolymer, ethylene-alkyl (meth)acrylate copolymer; and polypropylene resins such as polypropylene, ethylene-propylene block copolymer and ethylene-propylene random copolymer. Of such polyolefins, crystalline polyolefin is preferred. The crystalline polyolefin is suitable as a reinforcement for a light and tough light-shielding sheet because it can be improved in strength easily through a drawing operation and it is of light weight. The crystalline polyolefin, e.g. polyethylene and polypropylene, may contain a small amount of copolymerized component unless the crystallinity is seriously affected. Specific examples thereof include high density polyethylene, medium density polyethylene, linear low density polyethylene, polypropylene and ethylene-propylene block copolymer. Above all, polypropylene is particularly preferable. These may be used either alone or in combination. The melt flow rate (hereinafter abbreviated as MFR) of the polyolefin is normally within the range of 0.1-20 g/10 minutes, and preferably within the range of 0.2-10 g/10 minutes.

It is preferable that the yarn used as a starting material be a drawn yarn because the resulting reinforcement has an improved strength. The single yarn size of the drawn yarn falls within the range of 50-500 decitex (hereinafter, abbreviated as dt), and preferably 70-300 dt. A single yarn size less than 50 dt results in an insufficient reinforcing effect; whereas a single yarn size over 500 dt is also undesirable because it leads to increased rigidity, which results in loss of flexibility and worsening of handlability.

As the form of the drawn yarn, any form may be adopted such as a flat yarn obtained by slitting and stretching a film, a split yarn obtained by splitting a flat yarn, a monofilament obtained by stretching a filament extruded through a circular or profile nozzle, and a multifilament obtained by collecting small-size filaments. Of these yarns, a flat yarn is preferred in view of formability and smoothness. In particular, it is preferable to use a smooth flat yarn as a starting material because the reinforcement in the present invention is laminated to or woven with a white film. The drawn yarn may be any type of conjugate yarn such as a sheath-core type monofilament made of a high-melting component as the core and a low-melting component as the sheath and a parallel type flat yarn composed of a high-melting component as an intermediate layer and a low-melting component laminated on both sides of the intermediate layer.

A textile fabric is formed by use of the thus-obtained yarn, particularly a drawn yarn made of polyolefin. The resulting fabric is used as a reinforcement. In particular, it is preferable that a woven fabric obtained by weaving a polyolefin flat yarn as warps and wefts be used as a reinforcement. In this situation, a flat yarn made of a white film, which is a light-shielding material, may be woven together in the woven fabric.

The weave of the textile fabric is not particularly restricted. Examples of that of woven fabric include plain weave, twill weave, mock leno weave, gauze weave and leno weave. Examples of that of knitted fabric include raschel stitch, tricot stitch and milanese stitch. The weight per unit area of the textile fabric is within the range of 50-300 g/m$^2$, and preferably 70-150 g/m$^2$.

The nonwoven fabric used for the reinforcement in the present invention is not limited particularly. Nonwoven fabrics produced by various methods maybe employed. For example, either of meltblowing in which fibrous materials melt extruded using thermoplastic resin, especially polyolefin, are stacked randomly so that the molten fibrous materials are melt bonded with each other to form a sheet and spunbonding in which cooled fibrous materials are melt bonded with each other on hot emboss rolls to form a sheet may be employed. Moreover, a sheet-like material made of a laminated nonwoven fabric formed by arranging drawn yarns of thermoplastic resin longitudinally and latitudinally at predetermined intervals, stacking and bonding them at intersections may also be used.

The textile fabric or the nonwoven fabric may be used alone as a reinforcement. A laminate sheet obtained by laminating a lamination layer made of thermoplastic resin on at least one side of the textile or nonwoven fabric may be used as a base fabric for the reinforcement. Examples of the thermoplastic resin used for the lamination layer include polyolefin, polyester such as polyethylene terephthalate and polybutylene terephthalate, and polyamide such as nylon 6 and nylon 6,6. Polyolefin is suitably employed. Examples of the polyolefin used for the polyolefin lamination layer include polyethylene resins such as high density polyethylene, medium density polyethylene, branched low density polyethylene, linear low density polyethylene, ethylene-α-olefin copolymer produced by use of a metallocene catalyst, ethylene-vinyl acetate copolymer, ethylene-acrylic ester copolymer; and polypropylene resins such as polypropylene homopolymer, ethylene-propylene block copolymer and ethylene-propylene random copolymer. These may be used alone or in combination. The MFR of the polyolefin is normally within the range of 1-50 g/10 minutes, and preferably within the range of 5-30 g/10 minutes.

As the method for forming the lamination layer in the textile fabric or the nonwoven fabric, known methods such as extrusion lamination, dry lamination and sandwich lamination maybe employed. The extrusion lamination and the dry lamination are techniques of covering one side of the textile or nonwoven fabric with the lamination resin layer. The sandwich lamination is a technique of laminating the textile fabric or the nonwoven fabric and the white film via an adhesive layer made of a lamination resin disposed between the fabrics. The thickness of the lamination layer is preferably 20-100 µm, and more preferably 30-100 µm.

The light-shielding sheet of the present invention is required to have a high weatherability because it is often used outdoor and, in particular, is exposed to the sunlight for a long term. It, therefore, is desirable to incorporate a weathering agent such as a light stabilizer or a UV absorbent to the light-shielding material and the reinforcement in order to improve the weatherablity. A hindered amine light stabilizer is suitably employed as the light stabilizer. The weathering agent is employed by being contained in at least one of the white film, a substrate and the lamination layer. Preferably, the agent is employed by being contained in all of the white film, the substrate and the lamination layer.

When a protective film is laminated on the front surface of the white film, the weathering agent may be contained in the protective film. This can effectively prevent the light-shielding material and the reinforcement from deterioration. In such situations, the white film is not required to contain the weathering agent. As the material of the protective film, resins the same as those employed for the white film or the lamination resin described previously may be employed. "Front surface" used herein means the surface located in the side in which the sunlight comes; whereas the "back surface" means the surface opposite to the front surface. As the method for laminating the protective layer on the front surface of the white film, known methods such as extrusion lamination, dry lamination and hot press lamination may be adopted. From the viewpoint of formability, extrusion lamination is preferred. The thickness of the protective film is preferably 20-100 μm.

Examples of the UV absorbent include benzophenone type UV absorbents such as 2,4-dihydroxybenzophenone, 2-hydroxy-4-methoxybenzophenone, 2-hydroxy-4-octoxybenzophenone and 5,5'-methylenebis(2-hydroxy-4-methoxy benzophenones); benzotriazole type UV absorbents such as 2-(2'-hydroxy-5'-methylphenyl)benzotriazole, 2-(2'-hydroxy-5'-t-octylphenyl)benzotriazole, 2-(2-hydroxy-3',5'-di-t-butylphenyl)-5-chlorobenzotriazole, 2-(2'-hydroxy-3'-t-butyl-5'-methylphenyl)-5-chlorobenzotriazole and 2,2'-methylenebis(4-t-octyl-6-benzotriazol)phenol; benzoate type UV absorbents such as resorcinol monobenzoate, 2,4-di-t-butylphenyl-3'-5'-di-t-butyl-4'-hydroxybenzoate and hexadecyl-3-5-di-t-butyl-4-hydroxybenzoate. The incorporation proportion of the UV absorbent is preferably 0.05-5% by weight, and more preferably 0.1-1% by weight.

Examples of the hindered amine light stabilizer include bis(2,2,6,6-tetramethyl-4-piperidyl)sebacate, tetrakis (2,2,6, 6-tetramethyl-4-piperidyl)-1,2,3,4-butanetetracarboxylate, bis(1,2,2,6,6-pentamethyl-4-piperidyl)-di(tridecyl)-1,2,3,4-butanetetracarboxylate, a polycondensate of 1-(2-hydroxyethyl)-2,2,6,6-tetramethyl-4-piperidinol with diethyl succinate, and a polycondensate of 1,6-bis(2,2,6,6-tetramethyl-4-piperidylamino)hexane with 2,4-dichloro-6-t-octylamino-1, 3,5-triazine. The incorporation proportion of the light stabilizer is preferably 0.05-15% by weight, more preferably 0.05-5% by weight, and still more preferably 0.1-1% by weight.

In order to improve the weather resistance continuously for a long term, it is preferable to use, as the hindered amine light stabilizer, a high molecular hindered amine light stabilizer having a hindered amine as a side chain obtained by copolymerizing ethylene and a cyclic aminovinyl compound. One example of the ethylene-based copolymer is a copolymer of ethylene and a cyclic aminovinyl compound produced by high pressure radical copolymerization described in detail in JP-A 4-80215. One example of concrete products of the high molecular hindered amine light stabilizer is KOKANOX (commercial name; manufactured by Mitsubishi Chemical Corp). The incorporation proportion of the high molecular hindered amine light stabilizer is preferably 0.1-15% by weight, and more preferably 1-10% by weight.

In the present invention, the combined use of the weathering agent and the antioxidant shown below is preferable because a light-shielding sheet superior in heat resistance and in long-term durability is obtained. Such an antioxidant may be incorporated into any of the light-shielding material, the reinforcement and the protective film. Phenol antioxidants, amine antioxidants, sulfur-containing antioxidants, phosphorus-containing antioxidants, etc. are available as the antioxidant. Hindered phenol antioxidants are preferable. In particular, a combination use of a hindered phenol antioxidant and a phosphorus-containing antioxidant is preferred because the heat resistance is improved synergistically.

As the hindered phenol antioxidant, suitably employed is a compound having a phenol skeleton which has a t-alkyl group, e.g. t-butyl and t-amyl, on the carbon atom at one of its ortho positions with respect to the phenolic hydroxyl group and also has a bonding to an atom other than hydrogen or carbon such as sulfur, oxygen and nitrogen, at least one position selected from the remaining ortho position with respect to the phenolic hydroxyl group, the para position with respect to the phenolic hydroxyl group and the meta position with respect to the phenolic hydroxyl group which is also the para position with respect to the t-alkyl group.

Specific examples of the hindered phenol type compounds suitable for use in the present invention include n-octadecyl 3-(3,5-di-t-butyl-4-hydroxyphenyl)propionate, pentaerythrityl tetrakis[3-(3,5-di-t-butyl-4-hydroxyphenyl)propionate], triethylene glycol bis[3-(3-t-butyl-4-hydroxy-5-methylphenyl)propionate], 3,9-bis[2-{3-(3-t-butyl-4-hydroxy-5-methylphenyl)propionyloxy}-1,1-dimethylethyl]-2,4,8,10-tetraoxaspiro[5.5]undecane, tris(3,5-di-t-butyl-4-hydroxybenzyl)isocyanurate, 2-t-butyl-6-(3-t-butyl-2-hydroxy-5-methylbenzyl)-4-methylphenyl acrylate, 2,4-di-t-amyl-6-[1-(3,5-di-t-amyl-2-hydroxyphenyl)ethyl]phenyl acrylate, 2,4-di-t-butyl-6-[1-(3,5-di-t-butyl-2-hydroxyphenyl)ethyl]phenyl acrylate, 2,2'-ethylidenebis(4,6-di-t-butylphenol), 2,2'-methylenebis(4-methyl-6-t-butylphenol), 4,4'-thiobis(3-methyl-6-t-butylphenol), 4,4'-methylene-bis (2,6-di-t-butylphenol), 4,4'-butylidenebis(3-methyl-6-t-butylphenol), and 2,6-di-t-butyl-4-methylphenol. Above all, preferably employed are, for example, n-octadecyl 3-(3,5-di-t-butyl-4-hydroxyphenyl)propionate and pentaerythrityl tetrakis[3-(3,5-di-t-butyl-4-hydroxyphenyl)propionate]. The incorporation amount of these hindered phenol antioxidants is within the range of 0.02-1.0 part by weight, and preferably 0.05-0.2 part by weight.

In the present invention, it is preferable to use a hindered phenol antioxidant and a phosphorus-containing antioxidant in combination because the heat resistance is improved synergistically. Specifically, a combination of pentaerythrityl tetrakis[3-(3,5-di-t-butyl-4-hydroxyphenyl)propionate] as a hindered phenol antioxidant: tris(2,4-di-t-butylphenyl) phosphite as a phosphorus-containing antioxidant in a ratio of 1:1 to 1:4, a combination of octadecyl-3-(3,5-di-t-butyl-4-hydroxyphenyl)propionate: tris(2,4-di-t-butylphenyl) phosphate in a ratio of 1:1 to 1:4, and the like are preferable. The combined incorporation proportion of the antioxidants is 0.03-1.2% by weight, and preferably 0.05-0.7% by weight. An incorporation amount of the antioxidants of less than 0.03% by weight will result in an insufficient heat resistance, whereas an incorporation of antioxidants over an amount of 1.2% by weight is uneconomical because no further improvement in heat resistance will be obtained.

In the present invention, combined use of a weathering agent and an antioxidant is particularly preferable. The combined use results in a remarkably improved heat resistance due to a synergistic effect. The method for incorporating the weathering agent and the antioxidant may be a method in which these substances are directly fed into an extruder together with a thermoplastic resin. However, a method in which a master batch containing a weathering agent and an antioxidant in high concentrations is prepared and then the master batch is fed appropriately to an extruder is preferable in view of dispersibility.

To the white film and the thermoplastic resin for use in the present invention, additives commonly employed, such as a dispersing agent, a lubricant, an antistatic agent, pigment, inorganic filler, a crosslinking agent, a foaming agent and a nucleating agent, may be incorporated within an intended scope of the present invention.

In the present invention, when the white film is used in the form of a film consisting thereof as a light-shielding material, a light-shielding sheet 1 is formed, as shown in FIG. 1, by laminating a base fabric 2, as a reinforcement, which comprises a textile fabric or a nonwoven fabric obtained by weaving a drawn yarn 7 as warps and wefts to a white film 4. The method for the lamination may be lamination using an adhesive. It, however, is preferable to laminate the white film 4 and the base fabric 2 by forming a laminate layer 3 therebetween by sandwich lamination.

In the present invention, when tapes resulting from slitting the white film into a narrow width of about 5-50 mm are used as the light-shielding material, a light-shielding sheet 1 is formed by laminating the tapes 5 to the base fabric 2 which comprises a textile fabric or a nonwoven fabric obtained by weaving a drawn yarn 7 as warps and wefts while spacing the tapes apart from one another approximately in parallel as illustrated in FIG. 2. The method for the lamination may be lamination using an adhesive. It, however, is preferable to laminate the tapes 5 formed from a white film and the base fabric 2 by forming a laminate layer therebetween by sandwich lamination.

In the present invention, when a flat yarn is formed by slitting the white film into a narrow width of about 2-20 mm and then is used as the light-shielding material, a light-shielding sheet 1 is formed by combined weaving by using flat yarns 6 made of the white film as some warps and/or wefts and also using drawn yarns 7, preferably monofilaments or flat yarns, as other warps and/or wefts as illustrated in FIG. 3.

The light-shielding sheet obtained in the manner described above is suitably used for various applications such as light-shielding materials for agricultural or horticultural use, such as houses and tunnels, light-shielding materials for livestock use, such as chicken houses, pig houses and cow houses, light-shielding materials for works, such as protective sheets, and sheets for temporary tents for athletic meetings, entertainments and the like. Of these applications, the light-shielding sheet is most suitably used for light-shielding materials for houses for agricultural or horticultural use or light-shielding materials for tunnels for agricultural or horticultural use in view of light-shielding property, handlability, light weight and durability.

BEST MODES FOR CARRYING OUT THE INVENTION

EXAMPLE 1

In order to form a white film 4, 6% by weight of polybutylene terephthalate (melting point: 223° C.) and 2% by weight of titanium oxide were blended to polypropylene (MFR=2.0 g/10 minutes, density=0.90 g/cm$^3$) and the mixture was melt extruded into a sheet form by an extruder to form a 1.0 mm thick sheet. This sheet was 5-time stretched by a roll stretcher in the longitudinal direction at a roll temperature of 135° C. and then was 5-time stretched by a tenter stretcher in the transverse direction to form a 40 μm-thick white film 4. This white film 4 had a whiteness of 88 as measured by the ASTM-E313 method and a light transmission of 32% as measured by the ASTM-D1003 method.

On the other hand, a film was produced from polypropylene (MFR=2.0 g/10 minutes, density=0.90 g/cm$^3$) by inflation method using an extruder. This film was slit into a width of 18 mm and then stretched with a drawing ratio of 6 times by hot rolling to yield a flat yarn 7 with a size of 1000 dt. Using this flat yarn 7, a base fabric 2 made of a plain woven fabric was formed with a longitudinal and transverse weaving density of 10 yarns×10 yarns/2.54 cm.

Figure 1:
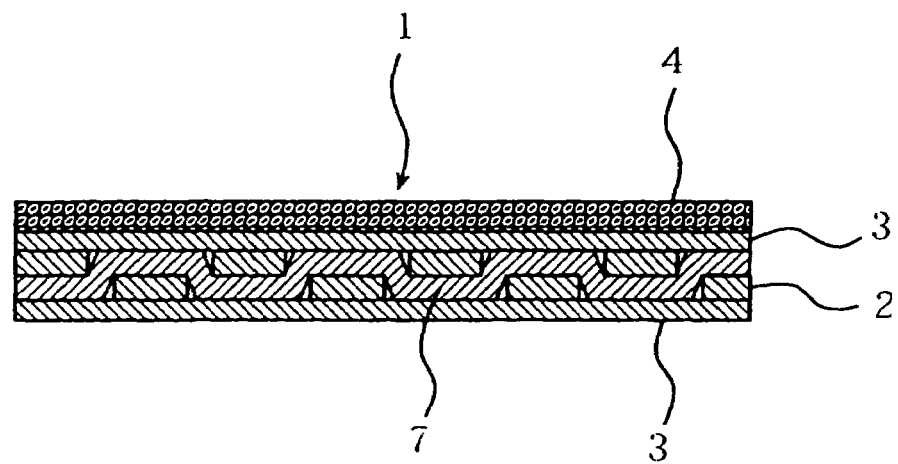
FIG. 1 is a schematic sectional view of the light-shielding sheet according to Example 1 of the present invention.

A 30 μm-thick lamination layer 3 was formed by laminating a low density polyethylene (MFR=8.0 g/10 minutes, density=0.918 g/cm$^3$) between the white film 4 and the base fabric 2 by sandwich lamination. The laminate was fabricated into a light-shielding sheet 1. Thus, a light-shielding material for agricultural use and horticultural use was formed (see FIG. 1). This light-shielding material for agricultural use and horticultural use was superior in light-shielding property, flexibility, handlability and durability and was employed suitably as a covering material for a fruit house.

EXAMPLE 2

A light-shielding material for agricultural use and horticultural use was obtained by forming a light-shielding sheet 1 in the same manner as Example 1 except that a 50 μm-thick white film having an expansion ratio of 1.1 was obtained by blending 1% by weight of azodicarbonamide to a low density polyethylene (MFR=1.0 g/10 minutes, density=0.922 g/cm$^3$), melt extruding the mixture into a sheet form by an extruder, and foaming the extrudate on heating. This white film 4 had a whiteness of 85 as measured by the ASTM-E313 method and a light transmission of 38% as measured by the ASTM-D1003 method. This light-shielding material for agricultural use and horticultural use was superior in light-shielding property, flexibility, handlability and durability and was employed suitably as a covering material for a vegetable cultivation house.

EXAMPLE 3

Figure 2:
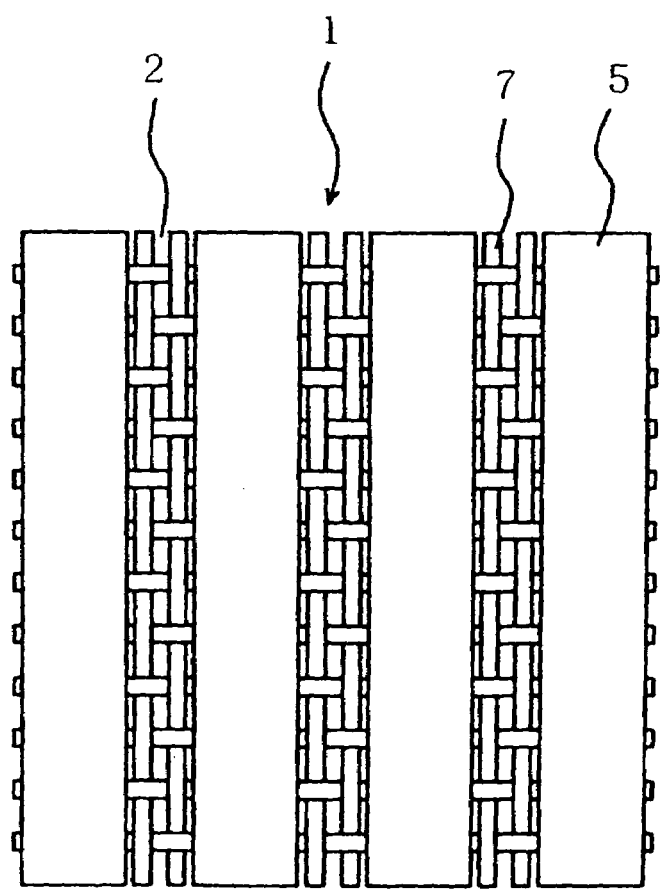
FIG. 2 is a plan view of the light-shielding sheet according to Example 2 of the present invention.

The white film obtained in Example 1 was cut into 20 mm-wide tapes 5, which were placed in parallel with a space of 10 mm on the base fabric obtained in Example 1. Lamination was conducted by sandwich lamination in the same manner as Example 1 to form a light-shielding sheet 1. Thus, a light-shielding material for agricultural use and horticultural use was formed (see FIG. 2). This light-shielding material for agricultural use and horticultural use was superior in light-shielding property, flexibility and handlability and was employed suitably as a covering material for an ornamental plant cultivation house.

EXAMPLE 4

Figure 3:
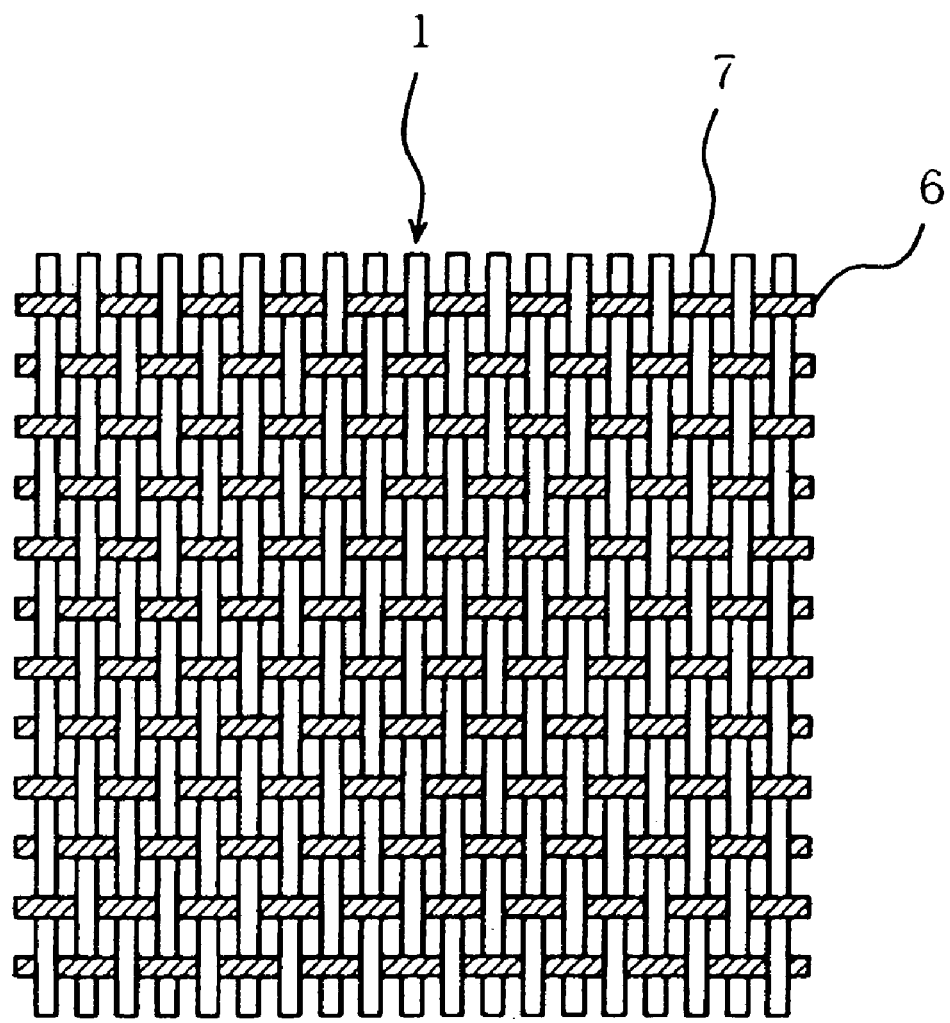
FIG. 3 is a plan view of the light-shielding sheet according to Example 3 of the present invention.

A 4 mm-wide flat yarn 6 was prepared using the white film obtained in Example 1. Using this flat yarn 6 as warps and the polypropylene flat yarn 7 formed in Example 1 as wefts, a plain woven fabric was formed with a longitudinal and transverse weaving density of 10 yarns×10 yarns/2.54 cm. The plain woven fabric was fabricated into a light-shielding sheet 1. Thus, a light-shielding material for agricultural use and horticultural use was formed (see FIG. 3). This light-shielding material for agricultural use and horticultural use was superior in light-shielding property, flexibility, handlability and durability and was employed suitably as a covering material for a vegetable tunnel.

EXAMPLE 5

A white film was produced in the same manner as Example 1 except blending no titanium oxide in Example 1. As a result, the white film 4 had a whiteness of 86 as measured by the ASTM-E313 method and a light transmission of 35% as measured by the ASTM-D1003 method. There was no great difference between the light transmission of this Example and the light transmission (32%) of the white film produced in Example 1. This suggests that the contribution to the decrease in light transmission does not result from the effect of titanium oxide as pigment but from generation of voids within the film.

EXAMPLE 6

Operations were conducted in the same manner as Example 1 except that in order to form a white film 4, a base fabric 2 and a lamination layer 3, 3% by weight of KOKANOX (commercial name; manufactured by Mitsubishi Chemical Corp.) as high molecular hindered amine light stabilizer was blended to the starting resin of each of the white film, the base fabric and the lamination layer. A light-shielding sheet 1 obtained through lamination demonstrated a change in color (determined in accordance with JIS L 0804) on 5th rank after a weathering test (a weatherometer irradiation for 400 hours (corresponding to one year) using a xenon lamp under conditions: a temperature of 63° C. and a humidity of 55%). Thus, the light-shielding sheet had a good weatherability. The light-shielding sheet of Example 1 to which neither weathering agent nor antioxidant had been added was subjected to a test the same as that described above. The sheet demonstrated an apparent change in color.

EXAMPLE 7

Operations were conducted in the same manner as Example 1 except that a 30 μm-thick protective film of a polypropylene (MFR=2.0 g/10 minutes, density=0.90 g/cm$^3$) was extrusion laminated on a white film 4 and that in the formation of the protective film, a base fabric 2 and a lamination layer 3, 3% by weight of KOKANOX (commercial name; manufactured by Mitsubishi Chemical Corp.) as high molecular hindered amine light stabilizer was blended to the starting resin of each of the white film, the base fabric and the lamination layer. A light-shielding sheet 1 obtained through lamination demonstrated a change in color (determined in accordance with JIS L 0804) on 5th rank after a weathering test (a weatherometer irradiation for 400 hours (corresponding to one year) using a xenon lamp under conditions: a temperature of 63° C. and a humidity of 55%). Thus, the light-shielding sheet had a good weatherability.

EXAMPLE 8

Operations were conducted in the same manner as Example 1 except that in order to form a white film 4, a base fabric 2 and a lamination layer 3, 3% by weight of KOKANOX (commercial name; manufactured by Mitsubishi Chemical Corp.) as high molecular hindered amine light stabilizer and 0.15% by weight of Irganox B215 (manufactured by Ciba Specialty Chemicals, a 2/1 mixture of pentaerythrityl trakis[3-(3,5-di-t-butyl-4-hydroxyphenyl)propionate]/tris(2,4-di-t-butylphenyl) phosphite as antioxidant were blended to the starting resin of each of the white film, the base fabric and the lamination layer. The light-shielding sheet 1 obtained through lamination was subjected to a 98° C. gear oven test. The sheet demonstrated a residual tensile strength of 99.8% after 119 days (corresponding to 10 years at normal temperature) and, therefore, had enough durability. The light-shielding sheet of Example 1 to which neither weathering agent nor antioxidant had been added was subjected to a test the same as that described above. The sheet demonstrated a residual tensile strength of 25.3%.

INDUSTRIAL APPLICABILITY

The white film used in the light-shielding sheet of the present invention can scatter the sunlight and can have a light transmission of not more than 50% because the film has voids or bubbles therein. A combination of a light-shielding material made of this white film and a reinforcement can provide a light-shielding sheet which has a light weight and a high strength, which is superior in durability and productivity, and which inhibits the temperature increase due to absorption of heat from sunlight. The sheet, therefore, is employed suitably, for example, as a light-shielding material of agricultural or horticultural houses.

The invention claimed is:

1. A light-shielding sheet, comprising:
    a light-shielding material comprising
        a white film having a light transmission of not more than 50%, and
        a reinforcement comprising a textile fabric or a nonwoven fabric,
    wherein at least one of the light-shielding material and the reinforcement contains a weathering agent;
    wherein said white film is a film having therein voids formed through stretching the film; and
    wherein said reinforcement is a woven fabric obtained by weaving a polyolefin flat yarn as warps and wefts.

2. A light-shielding sheet, comprising:
    a light-shielding material comprising a white film having a light transmission of not more than 50% and a reinforcement comprising a textile fabric or a nonwoven fabric,
    wherein at least one of the light-shielding material and the reinforcement contains a weathering agent and an antioxidant;
    wherein said white film is a film having therein voids formed through stretching the film; and
    wherein said reinforcement is a woven fabric obtained by weaving a polyolefin flat yarn as warps and wefts.

3. A light-shielding sheet, comprising:
    a light-shielding material comprising a white film having a light transmission of not more than 50% and a reinforcement comprising a textile fabric or a nonwoven fabric,
    wherein a protective film is laminated on a surface of the light-shielding material and the protective film contains a weathering agent;
    wherein said white film is a film having therein voids formed through stretching the film; and
    wherein said reinforcement is a woven fabric obtained by weaving a polyolefin flat yarn as warps and wefts.

4. A light-shielding sheet, comprising:
    a light-shielding material made of a white film having a light transmission of not more than 50% and a reinforcement made of a textile fabric or a nonwoven fabric, wherein tapes resulting from slitting the white film into a narrow width are laminated on one side of the reinforcement while being spaced apart from one another approximately in parallel.

5. A light-shielding sheet, comprising:

a light-shielding material made of a white film having a light transmission of not more than 50% and a reinforcement made of a textile fabric or a nonwoven fabric, wherein the light-shielding sheet comprises a woven fabric obtained by weaving a drawn yarn with a flat yarn as warps and/or wefts, the flat yarn resulting from slitting the white film into a narrow width.

6. The light-shielding sheet according to claim 1, wherein said white film has a thickness of from 10 to 100 µm.

7. The light-shielding sheet according to claim 5, wherein said width is 5 to 50 mm.

8. The light-shielding sheet according to claim 1, wherein said textile fabric has a weight per unit area of from 50 to 300 g/m$^2$.

9. The light-shielding sheet according to claim 1, wherein said weathering agent is a light stabilizer or a UV absorbent.

10. The light-shielding sheet according to claim 2, wherein said white film has a thickness of from 10 to 100 µm.

11. The light-shielding sheet according to claim 2, wherein said textile fabric has a weight per unit area of from 50 to 300 g/m$^2$.

12. The light-shielding sheet according to claim 2, wherein said weathering agent is a light stabilizer or a UV absorbent.

13. The light-shielding sheet according to claim 3, wherein said white film has a thickness of from 10 to 100 µm.

14. The light-shielding sheet according to claim 3, wherein said textile fabric has a weight per unit area of from 50 to 300 g/m$^2$.

15. The light-shielding sheet according to claim 3, wherein said weathering agent is a light stabilizer or a UV absorbent.

16. The light-shielding sheet according to claim 4, wherein said width is 5 to 50 mm.

17. The light-shielding sheet according to claim 4, wherein said white film has a thickness of from 10 to 100 µm.

18. The light-shielding sheet according to claim 4, wherein said textile fabric comprises a drawn yarn of a polyolefin.

19. The light-shielding sheet according to claim 4, wherein said textile fabric has a weight per unit area of from 50 to 300 g/m$^2$.

20. The light-shielding sheet according to claim 5, wherein said white film has a thickness of from 10 to 100 µm.

21. The light-shielding sheet according to claim 5, wherein said textile fabric comprises a drawn yarn of a polyolefin.

22. The light-shielding sheet according to claim 5, wherein said textile fabric has a weight per unit area of from 50 to 300 g/m$^2$.

* * * * *